A. W. OBERMANN.
RECEPTACLE AND UTENSIL.
APPLICATION FILED APR. 29, 1911.
1,052,942.
Patented Feb. 11, 1913.
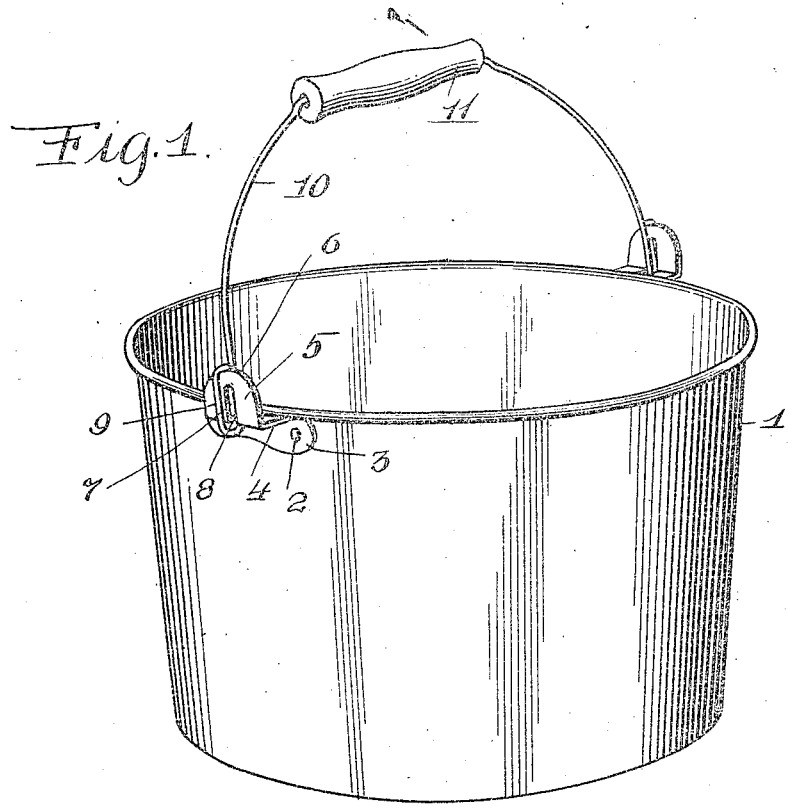
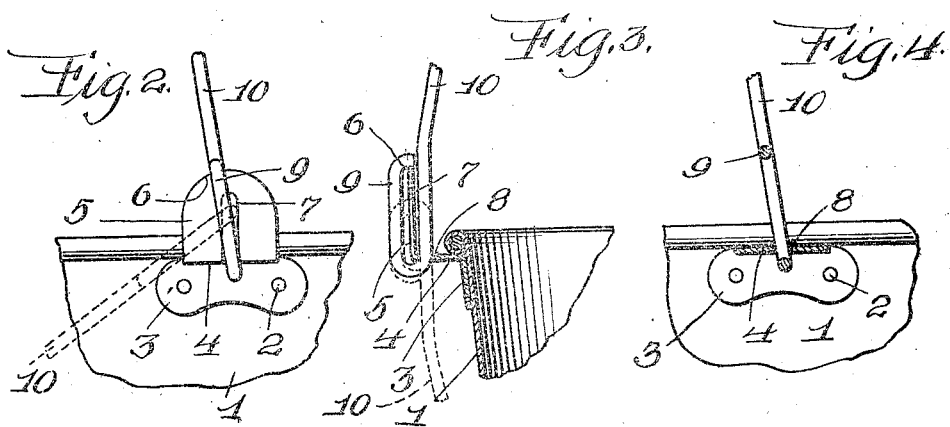
WITNESSES
Samuel Payne
K. H. Butler
INVENTOR
A. W. Obermann,
by N. C. Evert & Co.
Attorneys.

UNITED STATES PATENT OFFICE.

AUGUST W. OBERMANN, OF JOHNSTOWN, PENNSYLVANIA.

RECEPTACLE AND UTENSIL.

1,052,942.

Specification of Letters Patent. Patented Feb. 11, 1913.

Application filed April 29, 1911. Serial No. 624,128.

*To all whom it may concern:*

Be it known that I, AUGUST W. OBERMANN, a citizen of the United States of America, residing at Johnstown, in the county of Cambria and State of Pennsylvania, have invented certain new and useful Improvements in Receptacles and Utensils, of which the following is a specification, reference being had therein to the accompanying drawing.

This invention relates to receptacles and utensils having bails or pivoted handles, and the object of the invention is to provide a receptacle or utensil in a manner as will be hereinafter set forth for supporting the bail or pivoted handle whereby it cannot contact with the sides of the receptacle or utensil and become heated to that degree as to burn the hand when gripping the bail or handle.

My invention aims to provide ears that will permit of a bail or pivoted handle being swung to engage the outer walls of the receptacle or utensil, when necessary, otherwise supporting the bail or pivoted handle in an elevated position, whereby it cannot contact with the walls of the receptacle or utensil and become heated when the receptacle or utensil is placed upon a stove for heating the contents thereof. To this end, I provide a receptacle or utensil with diametrically opposed slotted ears that permit of the eyelet ends of the bail or pivoted handle being shifted within the ears, whereby the bail or pivoted handle can be supported in an upright position or in a lowered position against the walls of the receptacle.

The invention will be hereinafter specifically described and then claimed, and reference will now be had to the drawing, wherein:—

Figure 1 is a perspective view of a receptacle constructed in accordance with this invention, Fig. 2 is an enlarged side elevation of a portion of the same, Fig. 3 is an enlarged transverse sectional view of a portion of the receptacle, and Fig. 4 is a longitudinal sectional view of the same.

The reference numeral 1 denotes an ordinary receptacle or utensil and secured to the side walls thereof, preferably adjacent to the upper edges and at diametrically opposed points by rivets 2 or other fastening means are ears, each ear comprising a securing vertical flange 3 through which the rivets 2 extend, a horizontal body 4 formed integral with the upper edge of the flange 3, and a vertical portion 5 formed integral with the outer edge of the horizontal body 4, said vertical portion having the upper edges thereof rounded, as at 6. The vertical portion 5 is provided with a vertical centrally disposed slot 7 having the lower end thereof terminating in a short slot 8 formed centrally of the horizontal body 4, and these two communicating slots are adapted to accommodate the oblong eye 9 at one end of a bail or pivoted handle 10, said bail or handle having a rotatable grip 11.

With the lower ends of the eye 9 in the upper ends of the slots 7, the bail can be swung downwardly against the outer walls of the receptacle 1, and should it be desired to support the bail in an elevated position, as shown in Fig. 1, the eyes 9 are lowered in the slots 7 and 8 and by releasing the bail the lower ends of the eye 9 will rest upon the walls of the slots 7 and support the bail 10 in a vertical position, thereby preventing the bail from being heated by contacting with the side walls of the receptacle 1.

What I claim is:—

In combination, a receptacle having a bail-receiving ear, said ear having a bend to form angular portions and also having an elongated slot in said portions and extending through the bend, one of said angular portions having an unbroken curved peripheral edge, and a bail having an elongated eye mounted in the slot, said eye being of a length to permit it to pass through the slot at the bend when the bail is in an approximately vertical position, said eye and the walls of said slot forming the sole position-retaining means for the bail when the latter is in said vertical position, the eye of the bail having a length greater than the length of the other angular portion.

In testimony whereof I affix my signature in the presence of two witnesses.

AUGUST W. OBERMANN.

Witnesses:
H. C. EVERT,
C. T. HOOD.